United States Patent [19]
Ben Zvi et al.

[11] Patent Number: 5,589,260
[45] Date of Patent: Dec. 31, 1996

[54] METHOD AND APPARATUS FOR PRODUCING PLASTIC PRODUCTS

[75] Inventors: Guy Ben Zvi, Kibbutz Ramat Yohanan; Shlomo Nevo, Neot Afeka; Michael Berman, Kfar Yona, all of Israel

[73] Assignee: Palboard Ltd., Givatayim, Israel

[21] Appl. No.: 277,184

[22] Filed: Jul. 19, 1994

[30] Foreign Application Priority Data

Jul. 23, 1993 [IL] Israel .......................................... 106460

[51] Int. Cl.⁶ .............................. B29C 35/10; B32B 5/16
[52] U.S. Cl. ........................ 428/327; 264/460; 264/491;
264/113; 264/125; 264/126; 264/172.19;
264/DIG. 46; 264/DIG. 69; 264/140; 425/174.8 R;
425/371; 428/339; 428/402; 428/903.3
[58] Field of Search ................................ 264/25, 26, 113,
264/140, 125–6, 131, DIG. 46, DIG. 69,
434, 448, 460, 491; 425/174.8 R, 174,
371; 428/327, 339, 402, 903.3

[56] References Cited

U.S. PATENT DOCUMENTS

| | | | |
|---|---|---|---|
| 2,422,979 | 6/1947 | Pecker | 425/174 |
| 2,434,573 | 1/1948 | Mann et al. | 264/DIG. 46 |
| 2,697,254 | 12/1954 | Gordon | 264/DIG. 46 |
| 2,786,233 | 3/1957 | Merrill . | |
| 3,133,848 | 5/1964 | Proctor . | |
| 3,194,856 | 7/1965 | Palmer . | |
| 3,399,425 | 9/1968 | Lemelson . | |
| 3,470,286 | 9/1969 | Weber . | |
| 3,607,999 | 9/1971 | Corbett . | |
| 3,682,578 | 8/1972 | Lachiche | 425/174 |
| 3,835,212 | 9/1974 | Piacente . | |
| 4,154,893 | 5/1979 | Goldman | 264/25 |
| 4,155,968 | 5/1979 | Yamamoto et al. | 264/113 |
| 4,162,880 | 7/1979 | Cobbs, Jr. et al. | 264/DIG. 69 |
| 4,216,179 | 8/1980 | Lamberts et al. | 425/174 |
| 4,340,347 | 7/1982 | Robertson . | |

(List continued on next page.)

FOREIGN PATENT DOCUMENTS

| | | |
|---|---|---|
| 118079 | 9/1984 | European Pat. Off. . |
| 444330 | 9/1991 | European Pat. Off. . |
| 3744728 | 12/1988 | Germany . |
| 3744727 | 2/1989 | Germany . |
| 4105285 | 8/1992 | Germany . |
| 4113056 | 10/1992 | Germany . |
| 1238881 | 7/1981 | United Kingdom . |

OTHER PUBLICATIONS

Database WPI, Section Ch, Week 8416, Derwent Publications Ltd. London, GB; Class KB, AN 84–098385 C16! & JP–A–59 044 698 (EBARA MFG. K.K.) 13 Mar. 1984.
Database WPI, Section Ch, Week 8416, Derwent Publications Ltd. London, GB; Class AKE, AN 84–097878 C16! & JP–A–59 043 397 (Toyo Engineering Corp. and Doryoku–Kakunenryo Kaiha).
Database WPI, Section Ch, Week 8549, Derwent Publications Ltd. London, GB; Class AC, AN 85–303733 C49! & DD–A–225 942 (Veb Kunststoffe Sebnitz) 14 Aug. 1985.
Patent Abstracts of Japan, vol. 14, No. 541 (E–1007) 29 Nov. 1990 & JP–A–02 230 686 (Fuji Kobunshi K.K.) 13 Sep. 1990.
Patent Abstracts of Japan, vol. 15, No. 432 (M–1175) 5 Nov. 1991 & JP–A–03 182 310 (Kobe Steel Ltd.) 8 Aug. 1991.
Patent Abstracts of Japan, vol. 6, No. 163 (M–152) (1041) 26 Aug. 1982 & JP–A–57 080 032 (Okazaki Urethane Kogyo K.K.) 19 May 1982.

Primary Examiner—Jeffery R. Thurlow
Attorney, Agent, or Firm—Ladas & Parry

[57] ABSTRACT

A method and apparatus for producing plastic products from waste materials by: cutting into pieces a thermoplastic material having a loss factor higher than 0.005 such as to have a high absorbence of radio-frequency radiation, mixing the pieces with at least one other particulate material, depositing the mixture on a supporting surface; applying radio-frequency radiation to the mixture sufficient to soften mainly the outer surfaces of the pieces of thermoplastic material by dielectric heating, while applying pressure to the mixture to bond the mixture together by sintering; and removing the sintered mixture from the supporting surface.

12 Claims, 3 Drawing Sheets

U.S. PATENT DOCUMENTS

| | | | |
|---|---|---|---|
| 4,382,108 | 5/1983 | Carroll et al. | 264/122 |
| 4,402,889 | 9/1983 | Bonis . | |
| 4,597,922 | 7/1986 | Durbin | 264/26 |
| 4,756,858 | 7/1988 | Reifenhauser et al. . | |
| 4,810,445 | 3/1989 | Lamb, Sr. et al. | 264/112 |
| 4,968,463 | 11/1990 | Levasseur . | |
| 4,968,726 | 11/1990 | Thorsrud | 264/25 |
| 5,085,812 | 2/1992 | Ahrweiler et al. . | |
| 5,114,331 | 5/1992 | Umwhara et al. . | |

METHOD AND APPARATUS FOR PRODUCING PLASTIC PRODUCTS

FIELD AND BACKGROUND OF THE INVENTION

The present invention relates to a method and apparatus for producing plastic products. The invention is particularly useful for recycling waste plastic materials and is therefore described below with respect to this application.

The increase in usage of plastic materials in everyday life has created a serious disposal problem since most types of plastic materials are not readily degradable. Efforts are therefore continually being made to develop methods for recycling waste plastic materials not only to alleviate the waste-disposal and pollution problems, but also to lower the need for virgin plastic and other raw materials (e.g., wood) in producing various products and thereby to lower the cost of such products.

OBJECTS AND BRIEF SUMMARY OF THE INVENTION

According to one aspect of the present invention, there is provided a method of producing plastic products comprising: cutting into piece a thermoplastic material having a loss factor higher than 0.005 such as to have a high absorbence of radio-frequency radiation, the pieces being cut so that the bulk (i.e., the major portion) of the pieces have a size of 2–10 mm in their largest dimension; mixing the pieces of thermoplastic material with at least one other particulate material; depositing the mixture on a supporting surface; and applying radio-frequency (RF) radiation to the mixture sufficient to soften only the outer surfaces of the pieces of thermoplastic material by dielectric heating, while applying pressure to the mixture to bond the mixture together by sintering.

The "loss factor" of a material is defined as the power factor of the material multiplied by its dielectric constant, and determines the amount of heat generated in the material in the presence of RF radiation. A particularly suitable material is polyvinyl chloride, which has a loss factor ranging from 0.0054 to 0.32. Other high-loss factor materials that may be used are the acrylic resins which have a loss factor ranging from 0.056 to 0.1, and polycarbonates which have a loss factor of up to about 0.009.

The mixture also includes an organic plastic material having a loss factor lower than 0.005, i.e., having a low absorbence of radio-frequency radiation. This latter material is also cut into pieces such that the bulk thereof are from 2 to 10 mm in their largest dimension. Examples of such other materials are polyethylene having a loss factor of 0.00046 to 0.00072, polystyrene having a loss factor of about 0.00025, and polypropylene having a loss factor of about 0.00085. Where the low RF radiation absorbent material is also a thermoplastic, its outer surface is also softened by the heat generated in the plastic material of high RF radiation absorbence. The added materials of low RF radiation absorbence may also be thermosetting materials, in which case the softened thermoplastic material acts as a cement bonding together the thermosetting plastic pieces.

The method of the present invention thus permits strong solid products to be produced by sintering mixtures of different waste plastics which otherwise might be mutually incompatible if melted and mixed together. The mixture may include various other materials (e.g., stone, metal, wood, paper, glass, etc.) which might be present in the waste materials and otherwise costly to remove.

Such a method is therefore particularly useful for recycling waste plastic materials of various types.

According to another aspect of the present invention, there is provided apparatus for producing plastic products, also particularly useful for recycling plastics, comprising: a table extending longitudinally of the apparatus; a first conveyor belt moving longitudinally over the table for receiving pieces of thermoplastic material to be sintered; a second conveyor belt moving with and aligned over the first conveyor belt at an angle which converges therewith from one end to the opposite end of the first conveyor belt for applying gradually increasing pressure to the pieces of thermoplastic material on the first conveyor belt; and a plurality of pairs of radio-frequency electrodes spaced longitudinally along the length of, and straddling, the two conveyor belts; an RF generator connected to the electrodes for applying sufficient heat to soften the outer surfaces of the pieces of thermoplastic material at the same time as the pieces of thermoplastic material are heated by the radio-frequency radiation to sinter them into a layer on the first conveyor belt. According to further features, the apparatus also includes a source of compressed air. The radio-frequency electrodes are formed with apertures and are connected to the source of compressed air to produce a thin air cushion between the electrodes and the conveyor belts.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
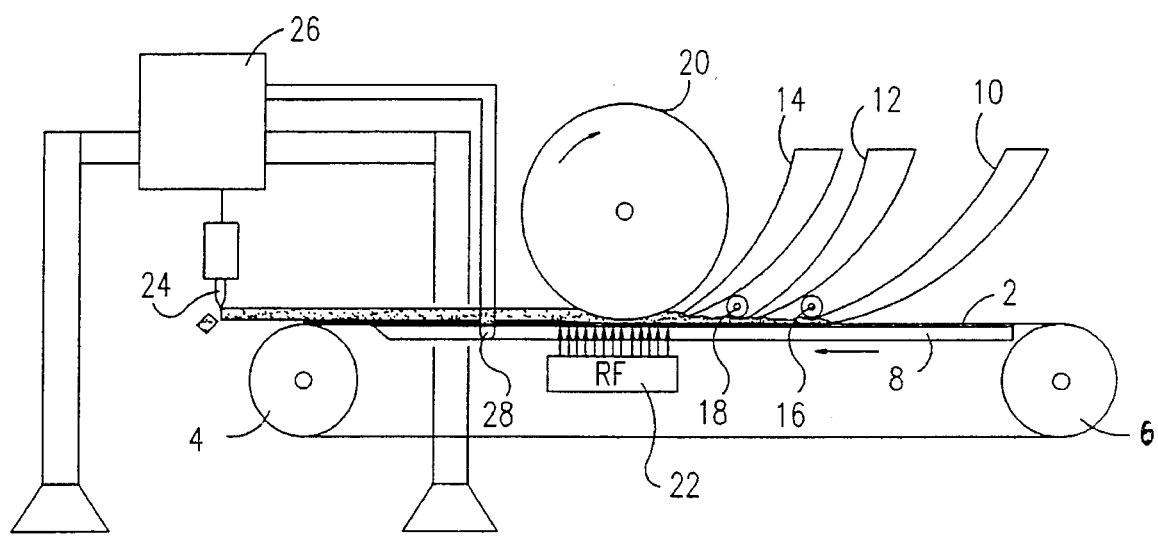
FIG. 1 schematically illustrates one form of apparatus for recycling plastic materials in accordance with the present invention.

The apparatus illustrated in FIG. 1 includes a closed-loop conveyor belt 2 driven by a pair of drums 4, 6 over a table 8. The plastic materials to be recycled may be waste materials obtained from various source but includes at least one thermoplastic material having a loss factor higher than 0.005 such as to have a high absorbence of RF radiation. The waste plastic materials are cut into pieces of various sizes such that the bulk of the pieces are between 2 mm and 10 mm in their largest dimension. The cut pieces are mixed together and supplied via three hoppers 10, 12 and 14, onto the conveyor belt 2 as it moves over table 8. The mixture supplied via hopper 10 is compacted into a first layer on belt 2 by means of a compacting roller 16 before the second layer is applied from the second hopper 12. The latter mixture is compacted onto the first layer by a second compacting roller 18, before the mixture from the third hopper 14 is applied thereover to define a third layer.

The three layers of the mixture on the conveyor belt 2 then move between a pressure roller 20 overlying the conveyor belt 2 and a radio-frequency (RF) heater. 22 underlying the conveyor belt 2 and the table 8 on which the belt is supported. Alternatively, the RF heating could be effected by a pair of RF electrodes, straddling the conveyor and mixture just before the pressure roller 20. The RF heater 22 heats the mixture by dielectric heating sufficiently to soften only the outer surfaces of the thermoplastic pieces. The pressure roller 20 presses the plastic pieces together and against the conveyor belt as it moves over the table 8, to bond the plastic pieces into a continuous plastic sheet or board.

The apparatus illustrated in FIG. 1 further includes a cutter blade 24 overlying the so-produced plastic sheet. Cutter blade 24 is moved by a drive 26 with the plastic sheet outputted by the apparatus, as synchronized by a speed sensor 28, and is driven against the sheet in order to cut it into segments of any desired length.

The mixture of materials deposited on the conveyor belt includes pieces of at least one thermoplastic material having a loss factor higher than 0.005, such as to have a high absorbence of radio-frequency radiation. The mixture preferably also includes at least one other organic plastic material having a loss factor lower than 0.005, such as to have a low absorbence of RF radiation.

For example, the plastic materials may be a mixture including rigid polyvinyl chloride, polyethylene, polystyrene, and/or polycarbonate wastes cut into pieces such that the bulk of the pieces are within the range of 2–10 mm; the RF heater 22 may be in the radio-frequency range, e.g., 13.56 MHz or 27.12 MHz, or in the microwave range, e.g., 915 or 2450 MHz. It should be capable of heating the plastic pieces by dielectric heating to a temperature of 110°–200° C. to soften only their outer surfaces. The pressure roller 20 may apply a pressure within the range of 0.5 to 3 KGm/cm$^2$.

Following is one example of a mixture of plastic pieces that could be used in the apparatus illustrated in FIG. 1 (the parts being given by weight):

| | |
|---|---|
| Polyvinyl chloride (rigid) | 33% |
| Polyethylene | 33% |
| Polystyrene | 28% |
| Polycarbonate | 6% |

The mixture could also include particles of an inorganic material having a high absorbence of RF radiation. A particularly useful material for this purpose is aluminum silicate. Such materials, being highly absorbent of RF radiation, enhance the concentration of the heat energy at the interfaces between the plastic pieces. When aluminum silicate is used, it is preferably included from 0.5 to 5.0%, by weight of the mixture. Following is another example of a mixture which includes aluminum silicate:

| | |
|---|---|
| Polyvinyl chloride (rigid) | 32% |
| Polyethylene | 32% |
| Polystyrene | 27% |
| Polycarbonate | 6% |
| Aluminum silicate | 3% |

The mixture could include other additives, for example a liquid material which polymerizes when heated to bond the plastic pieces together. An example of such a bonding material is an epoxy resin monomer which readily coats or wets the outer surfaces of the plastic pieces and which polymerizes at room temperature, or when heated to a temperature of about 50°–100° C., to bind the cut pieces together. The liquid binding agent used could also be a thermoplastic resin having a relatively low melting point (e.g., 120° C.) such that when it is heated, it melts and readily wets the cut pieces of plastic and binds them together when the mixture cools.

It will be appreciated that in the sheets or boards produced as illustrated in FIG. 1, one or both of the outer face layers could be relatively thin layers made of a virgin plastic material sintered in situ, or prefabricated thin sheets, whereas the recycled plastic (e.g., of one of the above compositions) could be applied as one or more relatively thick intermediate layers. In such a construction, the resulting laminated board would have the outer appearance of virgin plastic material even though a good portion, or even the bulk, of the laminated board is actually made of the recycled plastic waste materials. Also, thin metal or wood (veneer) foils could be used as the outer face layers instead of plastic sheets or films.

Figure 2:
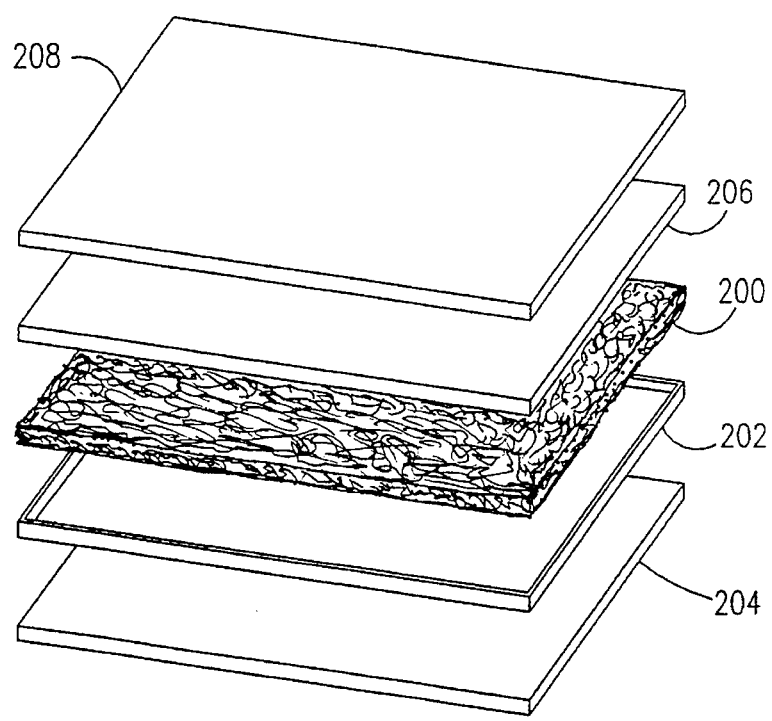
FIG. 2 illustrates a batch method for recycling plastic materials in accordance with the present invention.

FIG. 2 illustrates a method in which a mixture of one or more types of the above plastic materials to be recycled are cut into pieces and are deposited in the form of a layer 200 on a preformed plastic sheet 202 inside a mould 204 made of a material which is transparent to RF radiation. Another preformed plastic sheet 206 may then be laid on top of the layer of plastic pieces 200, and then the top panel 208 of the open mould is closed. The complete assembly is heated by RF radiation to soften mainly the outer surfaces of the plastic pieces 200, as well as the inner surfaces of the two plastic sheets 202 and 206. Pressure is applied between the two mould panels 204 and 208 to bond all the foregoing plastic materials into a single panel or board, or relatively flat shaped solid products.

The so-produced panel or board thus has the appearance of virgin plastic material since one or both of its two outer faces are made of such a material. The bulk of its volume, however, is constituted of the reclaimed plastic materials. In some cases, a metal foil or thin wood layer can be used as one or both face layers instead of plastic.

Figure 3:
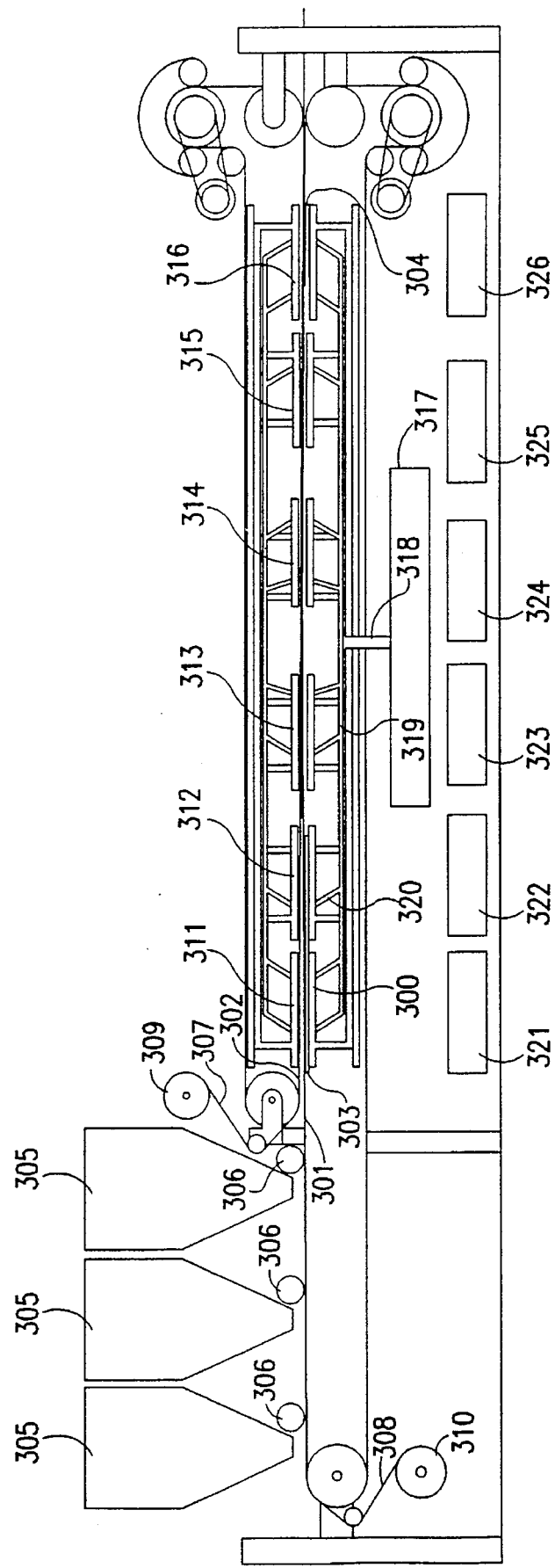
FIG. 3 schematically illustrates another form of apparatus for recycling plastic materials in accordance with the present invention.
Figure 4:
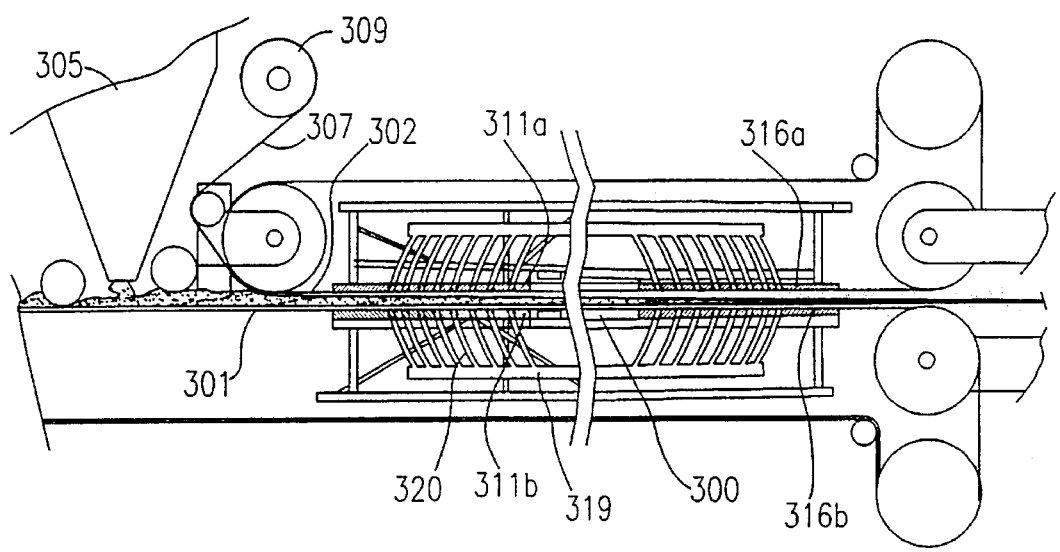
FIG. 4 is an enlarged fragmentary view of a part of the apparatus of FIG. 3.
Figure 5:
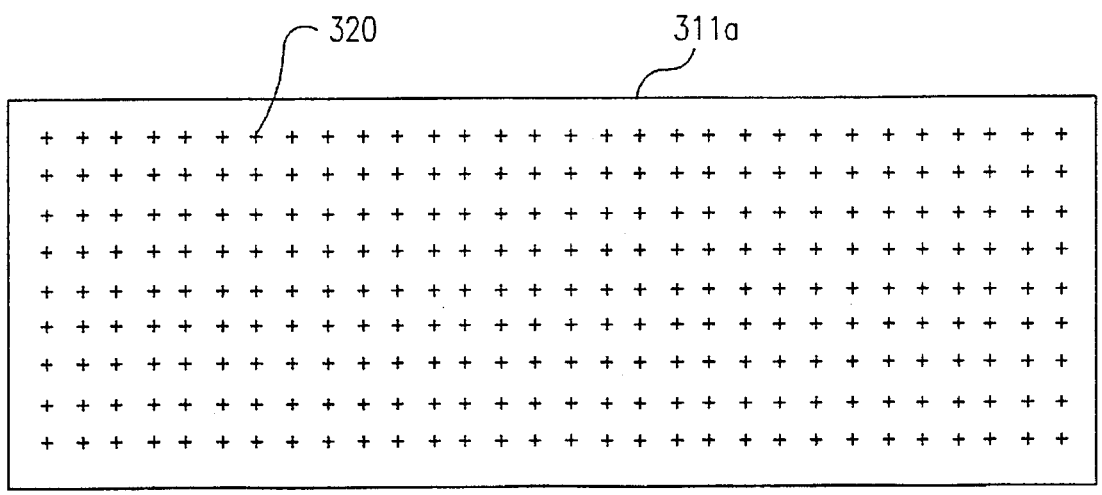
FIG. 5 illustrates one of the radio-frequency electrodes used in the apparatus of FIGS. 3 and 4.

FIGS. 3–5 illustrate a further form of apparatus that may be used. As shown in FIG. 3, the apparatus includes a table 300 extending longitudinally of the apparatus; a first closed-loop conveyor belt 301 moving longitudinally over the table; and a second close-loop conveyor belt 302 moving with and aligned over conveyor belt 301. Conveyor belt 302 is located at an angle with respect to conveyor belt 301 such that it is spaced therefrom at the entrance end 303 of the apparatus and converges towards it at the exit end 304 of the apparatus when the belt 302 is spaced from belt 301 a distance equal to the thickness of the board to be produced by the apparatus. Conveyor belt 302 thus applies gradually increasing pressure to the pieces of thermoplastic material on conveyor belt 301.

The mixture of plastic materials is deposited onto conveyor belt 301 from one or more hoppers 305 by means of accurate weight feeders or other feeders, each including a compactor roller 306. If desired, preformed sheets 307, 308, may be applied to the opposite sides of the material deposited onto conveyor belt 301 by supply rollers 309, 310, respectively.

The two conveyor belts 301, 302 are straddled by a plurality of pairs of RF electrodes 311–316 spaced longitudinally along the length of the two conveyor belts. Thus, as shown in FIG. 4, electrode pair 311 includes a lower electrode 311b underlying and engaging the lower belt 301, and an upper electrode 311a overlying and engaging the upper belt 302. These electrodes fix the converging angle defined by the upper belt 302 with respect to the lower belt 301. The material used for the belts must be strong, flexible, electrically insulating, and transparent to RF radiation. Preferably, the conveyor belts 301, 302 are made of a glass fabric coated with a material having a low dielectric constant, such as polytetrafluorethylene.

In order to reduce the friction between the electrode plates (e.g., 311a, 311b) and the belts 301, 302, all the electrode plates are preferably formed with a plurality of openings, as shown at 320 in FIG. 5, coupled to a source of compressed air to produce a thin (preferably less than 0.1 mm) air cushion between the electrodes and the conveyor belts. FIG. 3 schematically illustrates at 317 the source of compressed air, and at 318–320 the conduits leading the compressed air to the RF electrodes 311–316.

FIG. 3 also schematically illustrates the six RF generators 321–326 for the six pairs of electrodes 311–316, respectively. Each of the RF generators preferably has a maximum power output of 50 Kw. They are energized to produce a desired temperature profile, e.g., to gradually increase the temperature of the mixture heated in the apparatus as it moves from the entrance end 303 to the exit end 304. As one example, the RF generators may be controlled to heat the mixture to a temperature of 20° C. at the entrance end 303 and to a maximum temperature of 120°–180° C. at the exit end 304, sufficient to soften the outer surface of the RF radiation absorbent pieces of plastic (e.g., polyvinyl chloride). The pressure applied by the upper conveyor belt 301 at its exit end is preferably about 0.3 to 1.2 Kg/cm$^2$ sufficient to bond the softened particles together with the other elements of the mixture by sintering.

We claim:

1. A method of producing plastic products, comprising: cutting into pieces a thermoplastic material having a loss factor higher than 0.005 such as to have a high absorbence of radio-frequency radiation, the pieces being cut so that the bulk of the pieces have a size of 2–10 mm in their largest dimension; mixing said pieces of thermoplastic material with at least one other particulate material which is an organic plastic material having a loss factor lower than 0.005 so as to have a low absorbence of radio-frequency radiation; depositing said mixture on a supporting surface; applying radio-frequency heating radiation to said mixture sufficient to soften only the outer surfaces of said pieces of thermoplastic material by dielectric heating, while applying pressure to said mixture to bond the mixture together by sintering; and removing said sintered mixture from said supporting surface.

2. The method according to claim 1, wherein said thermoplastic material having a loss factor higher than 0.005 is polyvinylchloride, and said at least one other material having a loss factor lower than 0.005 is polyethylene, and is also cut into pieces such that the bulk thereof are of a size of 2–10 mm in their largest dimension.

3. The method according to claim 1, wherein said mixture further includes particles of an inorganic material having a high absorbence of radio-frequency radiation.

4. The method according to claim 3, wherein said particles of inorganic material are of aluminum silicate.

5. The method according to claim 1, wherein said mixture is deposited in a plurality of layers on said supporting surface before being heated by said radio-frequency radiation.

6. The method according to claim 1, wherein said mixture is deposited on a supporting surface in the form of a first conveyor belt moving longitudinally over a table and, while heated by said radio-frequency radiation, is subjected to pressure applied thereto by a second conveyor belt moving with and aligned over said first conveyor belt at an angle which converges therewith from one end of the first conveyor belt at which the mixture is deposited thereon, to the opposite end of the first conveyor belt, to thereby apply gradually increasing pressure to the pieces of thermoplastic material on said first conveyor belt at the same time as the mixture is heated by said radio-frequency radiation so as to bond the mixture together by sintering.

7. The method according to claim 6, wherein said radio-frequency radiation is applied by a plurality of pairs of radio-frequency electrodes straddling both said conveyor belts and the mixture heated thereby, said plurality of pairs of radio-frequency electrodes being spaced longitudinally along the length of the two conveyor belts and being energized to gradually increase the temperature of the mixture heated thereby according to a predetermined temperature profile as the mixture moves from said one end to said opposite end of the first conveyor belt.

8. The method according to claim 7, wherein compressed air is applied via openings in said radio-frequency electrodes to produce a thin air cushion between the electrodes and each of the two conveyor belts.

9. Apparatus for producing plastic products, comprising: a table extending longitudinally of the apparatus; a first conveyor belt moving longitudinally over said table for receiving pieces of thermoplastic material to be sintered; a second conveyor belt moving with and aligned over said first conveyor belt at an angle which converges therewith from one end to the opposite end of the first conveyor belt for applying gradually increasing pressure to the pieces of thermoplastic materials on said first conveyor belt; a plurality of pairs of radio-frequency electrodes spaced longitudinally along the length of, and straddling, the two conveyor belts and an RF generator connected to said electrodes for applying sufficient heat to soften the outer surfaces of the pieces of thermoplastic material at the same time as the pieces of thermoplastic material are heated by said radio-frequency radiation to sinter them into a layer on said first conveyor belt.

10. The apparatus according to claim 9, wherein said radio-frequency electrodes are formed with apertures and are connected to a source of compressed air to produce a thin air cushion between the electrodes and each of the two conveyor belts.

11. A plastic sintered product including pieces of a thermoplastic material having a loss factor higher than 0.005 such as to have a high absorbence of radio-frequency radiation, the bulk of said pieces having a size of 2–10 mm in the largest dimension, said pieces being mixed with pieces of an organic plastic material having a loss factor lower than 0.005 so as to have a low absorbence of radio-frequency radiation, said sintered product being made according to the method of claim 1.

12. The plastic sintered product according to claim 11, wherein said thermoplastic material having a loss factor higher than 0.005 is polyvinylchloride, and said plastic material having a loss factor lower than 0.005 is polyethylene.

* * * * *